United States Patent [19]
Morgan

[11] 3,953,047
[45] Apr. 27, 1976

[54] COLLAPSIBLE STACKING CART
[75] Inventor: Lawrence M. Morgan, Anoka, Minn.
[73] Assignee: The Cornelius Company, St. Louis Park, Minn.
[22] Filed: Feb. 25, 1975
[21] Appl. No.: 552,987

[52] U.S. Cl. .......................... 280/639; 280/33.99 T
[51] Int. Cl.² ......................................... B62B 11/00
[58] Field of Search ........... 280/36 R, 33.99 T, 79.3

[56] References Cited
UNITED STATES PATENTS

| | | | |
|---|---|---|---|
| 3,464,715 | 9/1969 | Anderson | 280/36 R |
| 3,522,954 | 8/1970 | Locke | 280/33.99 T |
| 3,746,358 | 7/1973 | Swick | 280/36 R |
| 3,840,243 | 10/1974 | Rheinhart | 280/36 R |

*Primary Examiner*—Robert R. Song
*Attorney, Agent, or Firm*—Henry C. Kovar

[57] ABSTRACT

A collapsible, stackable cart includes bottom, rear and side frames which are hinged and fold together for storage and which, when opened, are locked together in a normal use position by latches carried on and engagable between the bottom and side frames; the opened and latched cart is forkliftable and stackable one atop another.

19 Claims, 7 Drawing Figures

COLLAPSIBLE STACKING CART

BACKGROUND OF THE INVENTION

1. Field of the Invention

This invention relates to carts, and more specifically to a cart which is stackable and has a construction which is collapsible.

2. Prior Art

Carts have been previously provided that are both stackable in use and collapsible for the purpose of storage when not in use. These carts are typified as having fixed bases with sides which fold down for storage. Several problems are prevalent with this type of cart including need for a forklift truck to enable individual stacking and unstacking of callapsed carts as they are economically stored only one upon another. Other problems with the prior known carts include fragility and complexity of the locking mechanisms to maintain the load carrying side frames in the normal use positions; another problem has been the excessive manual manipulation required to either collapse or open the prior carts.

Accordingly, it is an object of the present invention to provide a stackable cart which is collapsible and then storable one alongside another.

Another object of the present invention is to provide a stackable cart which has a mechanism for collapsing which is of economical construction and is easily manipulable.

A further object of the present invention is to provide a cart with an extremely strong frame structure which is collapsible and capable of supporting a like cart, in stacked relationship, when loaded with goods.

Yet another object of the present invention is to provide a cart with a positive, strong and easily manipulable mechanism for locking the frame panels in the normal use positions.

A still further object of the present invention is to provide a collapsible stacking cart, which when vertically stacked and in use with another like cart, enables storage of the bottom frame of either cart, when the bottom is emptied, out of the path of access to the cart still having goods upon its bottom.

SUMMARY OF THE PRESENT INVENTION

In accordance with this invention, a collapsible, stackable cart comprises a rear frame, a pair of side frames hinged one each to opposite sides of the rear frame, supports for the cart on the bottom of the rear frame and each side frame, a bottom frame connected by a transverse hinge to and along the lower edge of the rear frame, and latches on the side and bottom frames which lock together and positively secure the frames in a normal position for the carrying of goods in the cart, and abutments along the top and bottom edges of the rear and side frames for stacking the cart vertically with a like cart.

Many other advantages, features and additional objects of the present invention will become manifest to those versed in the art upon making reference to the detailed description and the accompanying drawings in which a preferred structural embodiment incorporating the principles of the present invention is shown by way of illustrative example.

ON THE DRAWINGS

AS SHOWN ON THE DRAWINGS

Figure 1:
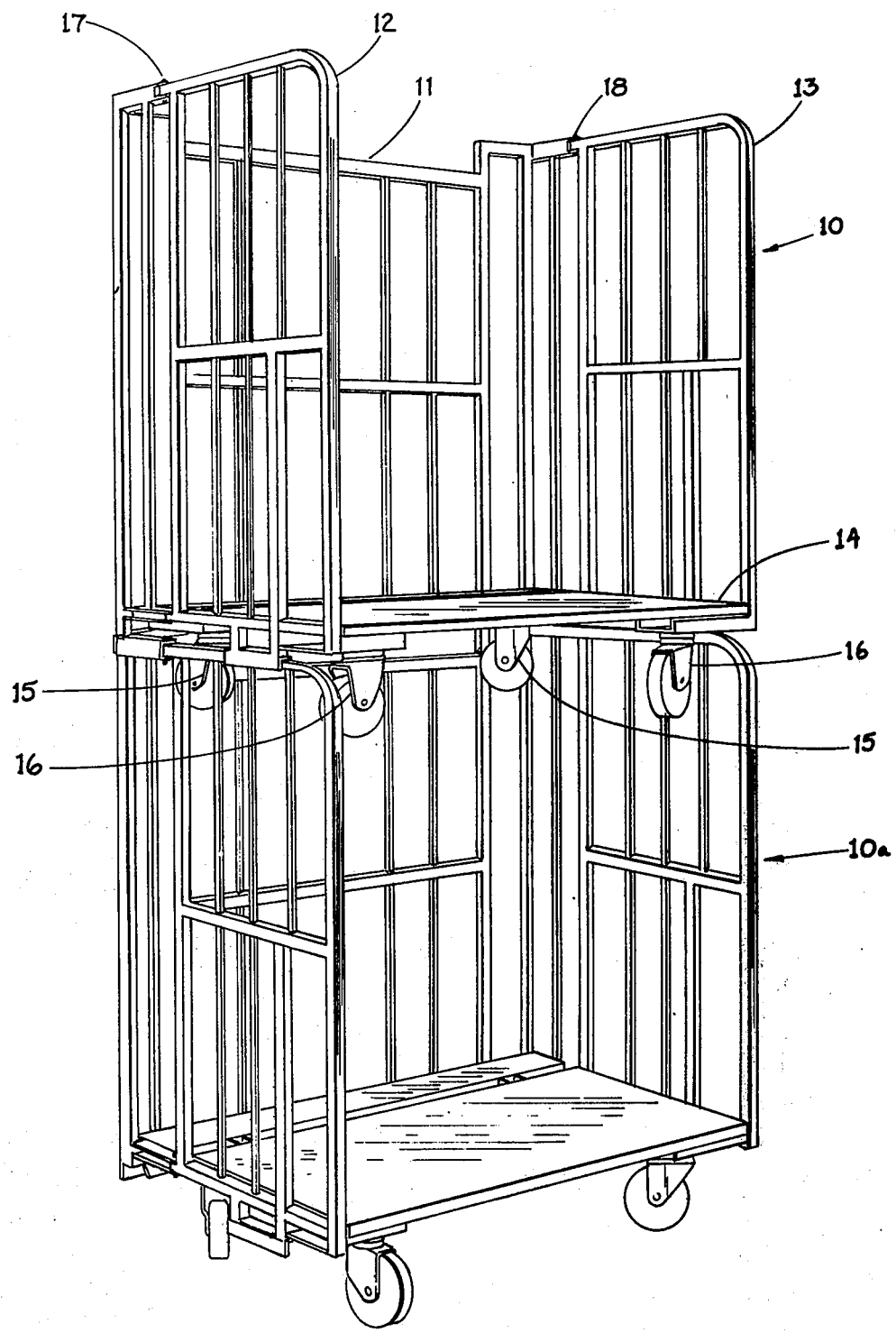
FIG. 1 is a perspective view of two of the carts in the present invention, stacked vertically one upon the other.

The principles of the present invention are particularly useful when embodied in a stackable cart, such as each of the identical pair shown in perspective in FIG. 1, and generally indicated by the numerals 10 and 10a. The cart 10 includes a rear frame 11, pivotable side frames 12 and 13, a pivotable bottom frame 14, rear support means 15 attached to the rear frame 11 and front support means 16 which are attached to a respective side frame 12, 13.

Figure 2:
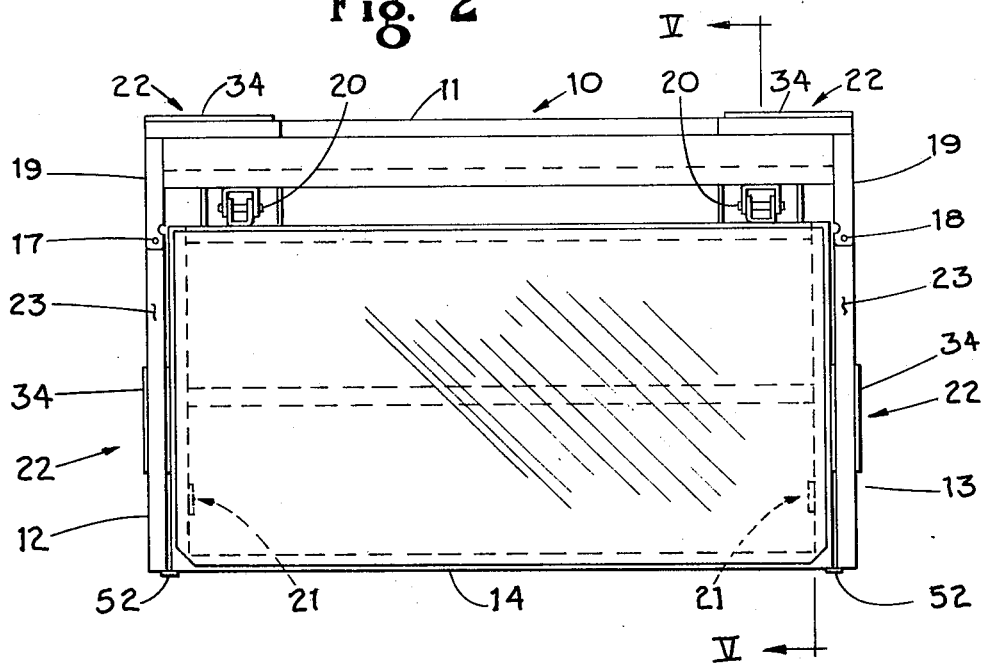
FIG. 2 is a top view of a single cart as is shown in FIG. 1.
Figure 3:
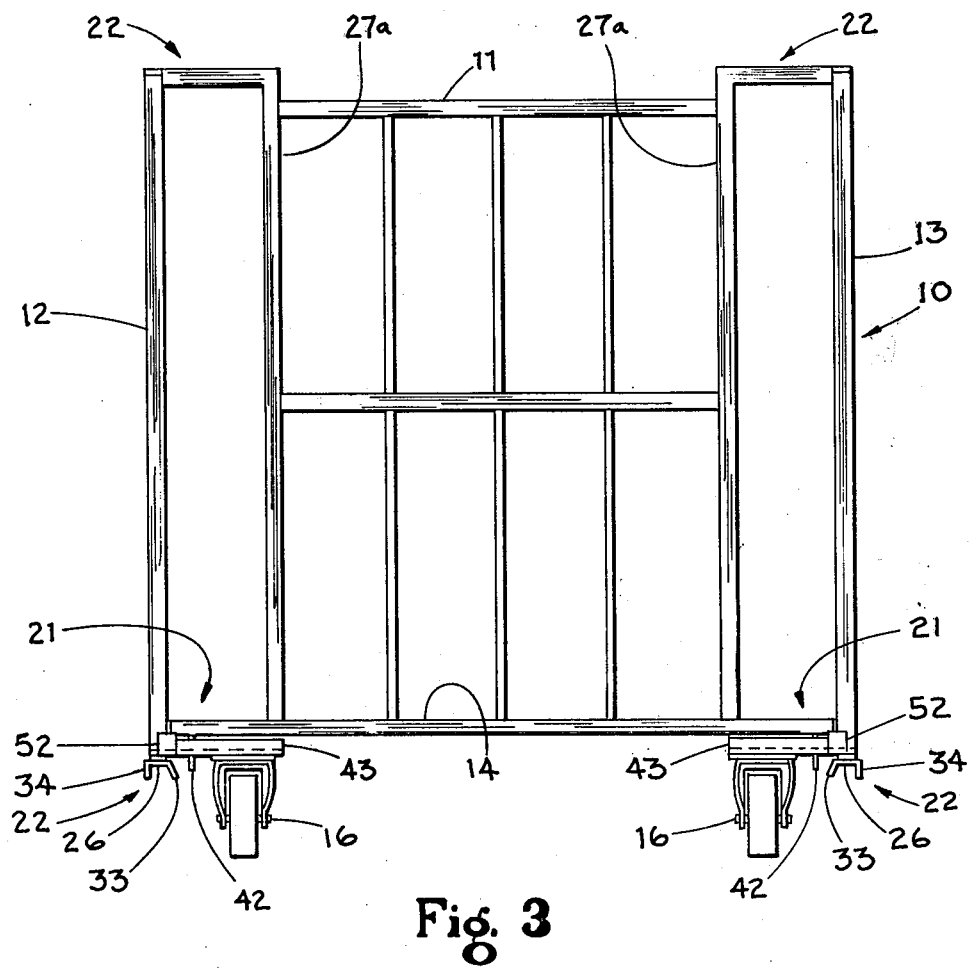
FIG. 3 is a front view of the structure of FIG. 2.
Figure 4:
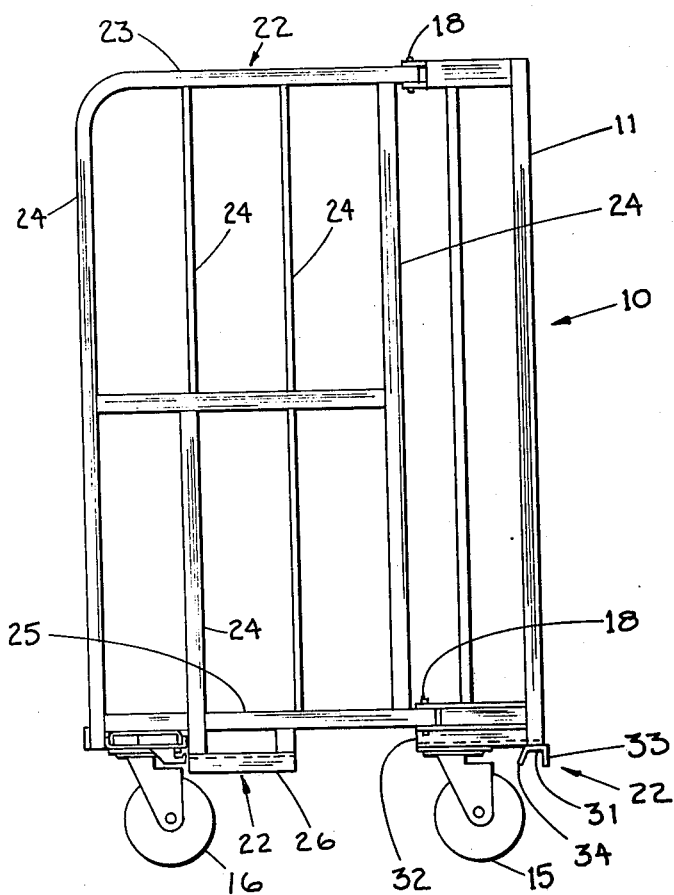
FIG. 4 is a side view of the structure of FIG. 2.

The rear frame 11 has vertical axis hinges 17 and 18 as best seen in FIG. 2, located on opposite sides and spaced forward of the rear frame 11 by hinge extenders 19. Side frame 12 is pivotally mounted in hinge 17 and side frame 13 is pivotally mounted in hinge 18. The bottom frame 14 is slidably and pivotally connected to rear frame 11 by a transverse horizontal axis slotted hinge 20 and is pivotable from a normally horizontal position, as shown, for support of goods thereon, to an upright storage position generally parallel and adjacent to the rear frame 11. The pivotable side frames 12, 13 and bottom frame 14 are fixed in a normal usage position by latch means, generally indicated by 21, which lock to fix the frames 12, 13, 14 in the normal position.

Each of the side frames 12, 13 and the rear frame 11 are provided with abutments generally indicated by 22, which form means for stacking cart 10 upon a second like cart 10a. Each of the side frames 12, 13 has an upper horizontal member 23 which forms a load-bearing abutment 22 which is securely supported by vertical structural side members 24 which in turn are secured to lower horizontal members 25 of the side frames 12, 13. At the bottom of each side frame 12, 13 is a downward facing C-section channel 26 which is spaced below each respective lower member 25 and form the lower stacking abutments 22.

Figure 6:
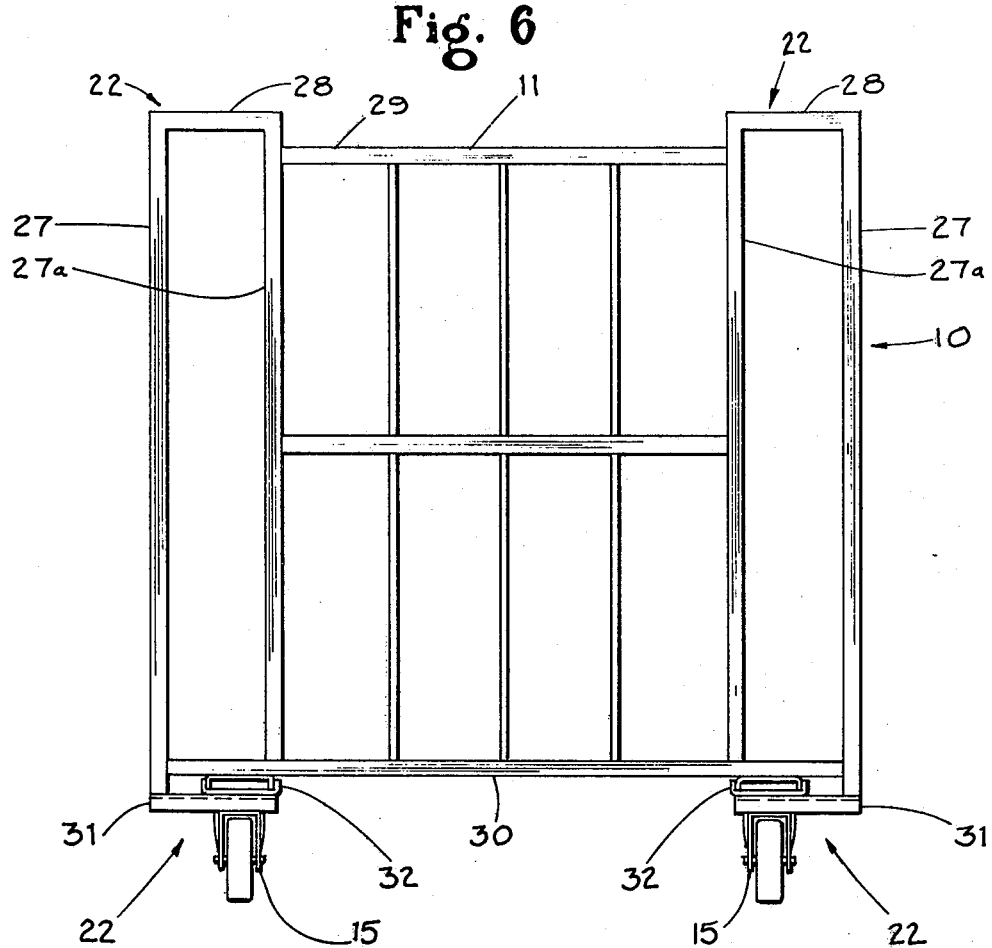
FIG. 6 is a rear view of the structure of FIG. 2.

The rear frame is provided with abutments 22 as is best shown in FIG. 6. At each corner of rear frame 1 there are a pair of relatively large section upright structural members 27, 27a connected at the top by a horizontal member 28 and at the bottom by arrangement of components, as will be described, forming stacking abutments 22. A central upper cross member 29 is mounted in rear frame 11 at a level below horizontal members 28 to provide clearance for a fork lift tongue (not shown). A lower horizontal cross member 30 mounted in rear frame 11 and extends continuously across the width of rear frame 11 and is joined to the outer vertical members 27. Each outer vertical member 27 extends downward past the lower cross member 3 and forms mounts and supports for one end of rear frame C-section stacking channels 31. The other end of the stacking channels 31 are mounted against support platforms 32 which in turn are mounted to cro member 30 and structurally under inner vertical members 27a to form a rectangular load bearing structure in each corner of rear frame 11. Cross member 30 is positioned at a level above the level of stacking channel 31 to give clearance for the tongue of a fork lift (not shown). Each of the C-section channels 26, 31 have an inner flange 33 and an outer flange 34 which form a downwardly divergent angle to receive the respective upper members 23, 28 when cart 10 is lowered upon a like cart 10a. Outer flanges 34 are parallel to and directly below the outer surface of a respective side frame 12, 13 or rear frame 11 to minimize width and depth of cart 10 while the inner flanges 33 open inwardly to guide a cart 10 down upon a like cart 10a. Each of the rear channels 31 will stackingly rest atop horizontal members 28 and position an upper cart 10 fore and aft while side frame channels 26 rest atop side frame upper members 23 and laterally position an upper cart 10 atop a like cart 10a. The channels 26, 31 are secured to their respective side frames 11 at a level below the normal horizontal position of the bottom frame 14 to provide clearance for a fork lift (not shown) when cart 10 is atop a like cart 10a. In order to keep cart 10 at a minimum width and depth without wasting space, the support means 15, 16 are positioned inwardly from the inner surfaces of the cart 10 as defined by inside surfaces of said frames 12, 13 and rear frame 11; this enables the support means 15, 16 of cart 10 to be lowered within the confines of a like cart 10a when stacking.

Figure 5:
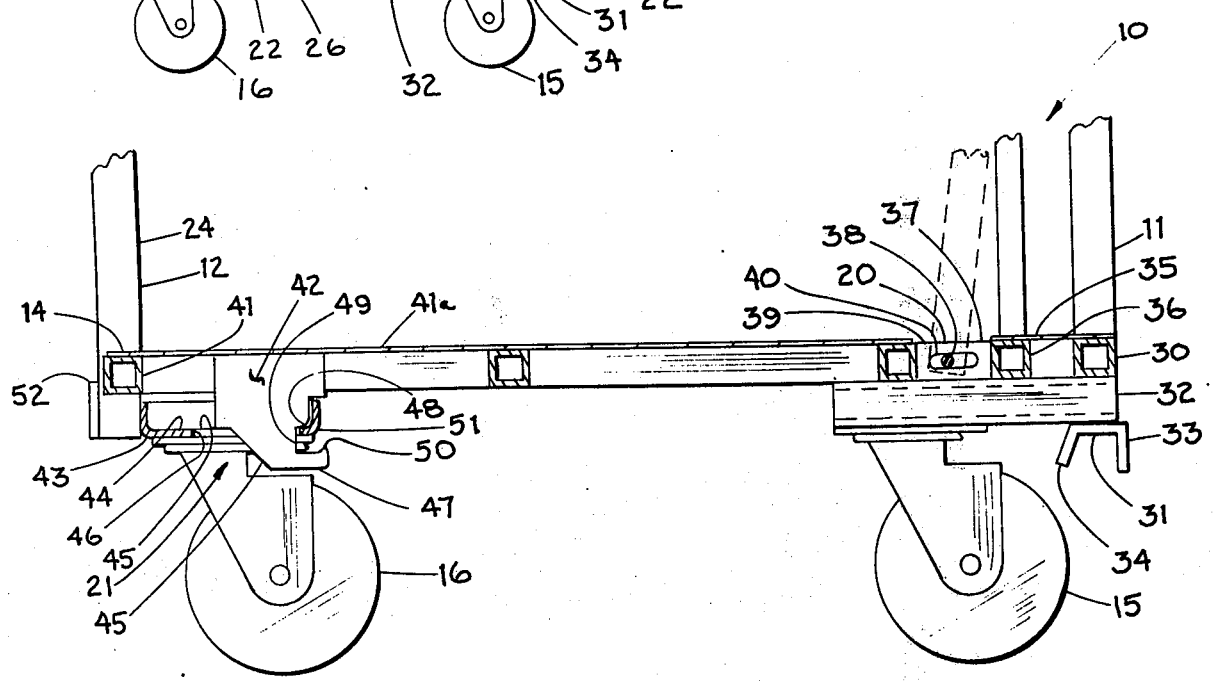
FIG. 5 is a sectional view along lines V—V of FIG. 3.

The structure of bottom frame 14 and latch means 21 is best shown in FIG. 5. Rear frame 11 has a bottom shelf 35 which extends forward and is for support of goods which may overhang rearward from the bottom frame 14. Underneath the bottom shelf 35 is a transverse structural member 36 which supports shelf 35 and serves as a mount for the front of rear support plates 32. Transverse hinge 20 is attached to structural member 36 by portions 37 and has a hinge pin 38 and a portion 39 attached to bottom frame 14. Hinge 20 is provided with a slot 40 which enables bottom frame 14 to be slid fore and aft as well as pivoted. The bottom frame 14 has a tubular structure 41 to which a shelf 41a, a portion 39 of hinge 20, and a pair of hooks 42 are attached. Hooks 42 are part of the latch means 21.

Front support platforms 43 are attached one to each of the side frames 12, 13 and extend inward from the respective side frame 12, 13 to which they are attached. Front support means 16 are attached to each of the front support platforms 43. Each front support platform 43 forms a latch bracket 44 having a slot 45 to receive a respective latch hook 42. Each hook 42 and slot 45 lie in a plane perpendicular to the axis of transverse hinge 20 and each hook 42 extends vertically downward from the bottomframe 14 when the bottom frame 14 is horizontal to provide for downward engagement of the latch means 21 when the bottom frame 14 is pivoted downward and then slid fore and aft to lock the latch 21 as will be described. Each hook 42 has a cam surface 45 which engages a front edge 46 of slot 40 to bias bottom frame 14 rearward into the lock position, a hook tang 47 which passes through slot 40 and hooks underneath bracket 44 and a support abutment 48 which engages bracket 40 and limits downward pivoting of bottom frame 14 as well as supporting the bottom frame 14 in a generally horizontal position. The bottom frame 14 may be varied from true horizontal in order to provide a slight rearward tilt in order to prevent goods from falling off by lengthening the vertical dimensions of the hooks 42 as is desired. Rearward stops 49 are provided on each hook 42 to limit rearward travel of the bottom frame 14. Each hook 42 also may have a safety catch 50 which is an upward project on the end of tang 47. When the cart 10 is picked up by a fork lift truck, the fork (not shown) will engage the front of the bottom frame 14 as well as rear frame 11 and the side frame 12, 13 will tend to fall downward about transverse hinge 20. Tang 47 will engage the lower surface of bracket 44 and prevent the side frames 12, 13 from falling and safety catch 50 will project upward behind the rear edge 51 of bracket 44 preventing the bottom frame 14 from sliding forward with respect to the side frames 12, 13 which would enable latches 21 to disconnect. To assure engagement of safety catch 50 with rear bracket edge 51, a bottom stop 52 is provided on each of the side frames which prevents forward movement of the bottom frame 14 when latch means 21 are fully engaged and when a fork lift truck picks up cart 10 by the front edge of bottom frame 14. As can be seen in FIG. 5, tang 47 is extended or spaced below bracket 44 and requires a predetermined amount of upward travel of bottom frame 14 before engagement against bracket 44 or engagement of safety catch 50 with bracket edge 51. Bottom stops 52 extend upward in front of bottom frame 14 a lesser amount than safety catch 50 is spaced below edge 51 by approximately one-eighth inch or 3 millimeters and when the bottom frame 14 is manually lifted to this intermediate position where neither the bottom stop 52 or safety catch 50 is engaged, the bottom frame 14 can be pulled forward and place the tang 47 directly below the slot 40 and then pivoted upward to disengage the latch means 21 and then further pivoted upward into an upward storage position adjacent the rear frame 11 as shown in dotted lines.

Figure 7:
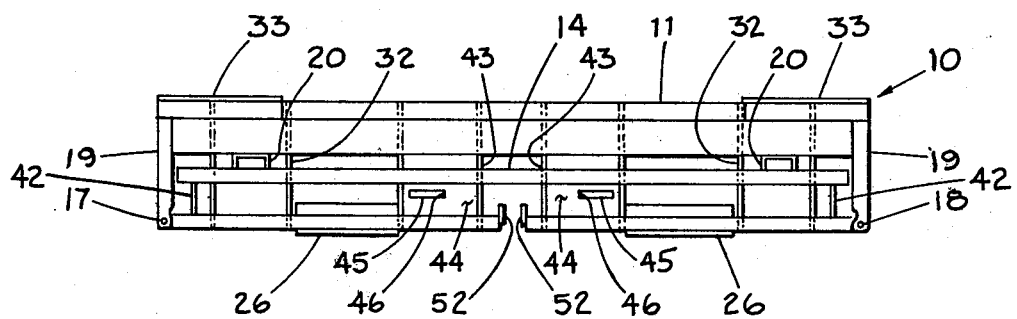
FIG. 7 is a top view of the structure of FIG. 2, in an alternative collapsed position.

When the bottom frame 14 is in the upward storage position, each of the side frames 12, 13 can be pivoted inward about hinges 17, 18 to storage positions as shown in FIG. 7 where the cart is shown collapsed for either shipping or for storage when empty.

To load the cart with goods, side frames 12, 13 are turned outward until perpendicular to rear frame 11 and bottom frame 14 is pivotally lowered and pulled forward until cam 45 engages the front edge 46 of slot 40. AS the bottom frame 14 continues downwardly, cam 45 biases the bottom frame 14 rearward over the bottom stop 52 until tang 47 has passed through slot 40 and is below bracket 44. The bottom frame 14 is then pushed rearward and tang 47 goes underneath bracket 44 and the bottom frame 14 drops off stop 52 and falls into a normal position wherein the latch means 21 is locked and both side frames 12, 13 and bottom frame 14 are locked into normal positions generally perpendicular to rear frame 11 to jointly define a space into which goods can be placed.

A cart 10 which is so arranged and has the latches 21 locked can be fork lifted from below bottom frame 14 to atop a like cart 10a either with goods or empty. When cart 10 is atop a like cart 10a and has been emptied of goods, bottom frame 14 can be raised to the storage position as has previously been described and the stacking channels 26, 31 will retain cart 10 atop cart 10a in a stable position even though latch means 21 has been disengaged.

Although various minor modifications may be suggested by those versed in the art, it should be understood that I wish to embody within the scope of the patent warranted hereon, all such embodiments are reasonably and properly come within the scope of my contribution to the art.

I claim as my invention:

1. A collapsible, vertically stackable merchandise cart comprising:
   a. a rear frame of upright rectangular shape;
   b. a pair of upright rectangular side frames hingedly attached one to each side of the rear frame and pivotable from normal positions generally perpendicular to the rear frame to alternate storage positions;
   c. support means disposed below and secured to the rear frame and each side frame respectively;
   d. a horizontal axis hinge having a portion secured to one of the upright frames;
   e. a bottom frame secured to another portion of the horizontal axis hinge and pivotable from a normally generally horizontal position for support of goods thereon to an upright storage position adjacent to the respective one upright frame;
   f. latches mounted on side and bottom frames, which lock together and positively secure the side and bottom frames pivotably immovable in the normal positions, the cart being forkliftable by the bottom frame when latched and locked; and
   g. means for stacking the cart vertically upon a like cart when both carts have side and bottom frames latched and secured in the normal position, the stacking means including vertically engagable and horizontally positioning abutments mounted on the top and on the bottom of the side and rear frames.

2. A cart according to claim 1, in which the bottom stacking means comprises downward facing C-section channels with inner and outer flanges forming downwardly divergent angles, the outer flanges being parallel to and directly below the outer surface of the respective frame to which each channel is mounted, the inner flanges opening inwardly for guiding the cart down upon a like cart.

3. A cart according to claim 1, in which the horizontal axis hinge is slotted and the bottom frame, when generally horizontal, is slidable in the slotted hinge into and out of the normal position and the latch means locks upon sliding of the bottom frame into the normal position.

4. A cart according to claim 1, including a pair of upright structural members along each side of the rear frame which are connected at top and bottom of the rear frame by the stacking means, forming separate rectangular load-bearing structures on each side of the rear frame.

5. A cart according to claim 1, including a central upper cross member mounted in the rear frame at a level below the top stacking means.

6. A cart according to claim 1, in which each side frame has thereon a stacking means having an abutment for lateral positioning of the side frame atop a like side frame of a like cart, the latches being unlockable and the bottom frame being pivotable into and out of the storage position when the cart is stacked upon a like cart, the side frame stacking means being operable for maintaining unlatched side frames in the normal positions atop of the latched side frames of a like cart.

7. A cart according to claim 1, including a continuous lower cross member extending across and mounted to the rear frame, the rear frame support means being mounted to and against the bottom of the cross member, the rear frame bottom stacking means being mounted directly below the cross member and to and against the rear frame support means.

8. A cart according to claim 7, in which the rear frame includes a bottom shelf extending forward for support of goods thereon, there being a structural member in the rear frame extending across and under the width of the shelf, the rear frame support means being secured to the shelf structural member.

9. A collapsible merchandise cart comprising:
   a. a rear frame of generally upright rectangular shape;
   b. a pair of side frames hingedly attached, one each to opposite sides of the rear frame, each side frame being pivotable from a normal position generally perpendicular to the rear frame to an alternate storage position;
   c. a transverse hinge having a slotted connection and a portion attached to the rear frame;
   d. a bottom frame secured to another portion of the transverse hinge, the bottom frame being pivotable from a generally horizontal position to an upright storage position and slidable fore and aft when horizontal into and out of a normal position for support of goods thereon; and
   e. latches mounted on the side and bottom frames which engage when the bottom frame is slid into the normal position for positively securing the side and bottom frames in the normal positions.

10. A cart according to claim 9, in which the latches comprise a pair of hooks and a pair of brackets receptive of the hooks, one pair being mounted one each on opposite front corners of the bottom frame and the other pair being mounted one on each side frame.

11. A cart according to claim 10, in which the hooks lie in a plane perpendicular to the axis of the transverse hinge when the frames are in the normal position.

12. A cart according to claim 9, in which the hooks extend vertically when the bottom frame is generally horizontal, and are engagable with the brackets upon downward pivoting of the bottom frame to generally horizontal when the side frames are in the normal position.

13. A cart according to claim 9, in which the latches engage when the bottom frame is slid aft.

14. A cart according to claim 9, in which at least one of the side frames has a stop which engages the bottom frame when in the normal position and precludes forward movement of the bottom frame.

15. A cart according to claim 9, in which the bottom frame is supported in the normal position by the latches.

16. A cart according to claim 9, including a safety catch mounted on and operative between the side and bottom frames for precluding disengagement of the latches when the cart is supported by the bottom frame.

17. A cart according to claim 16, in which the safety catch engages upon upward movement of the bottom frame a predetermined amount from the normal position, and at least one of the side frames has a stop which engages the bottom frame when in the normal position for limiting sliding movement of the bottom frame, the stop requiring an upward movement of the bottom frame for stop disengagement of a lesser amount than that required to engage the safety catch.

18. A collapsible merchandise cart comprising:

a. an upright rear frame of generallly rectangular shape;
b. a pair of upright side frames hingedly attached, one each to opposite sides of the rear frame, each side frame being pivotable from a normal position generally perpendicular to the rear frame into an alternate storage position;
c. a horizontal axis hinge having a slotted connection and a portion attached to one of the upright frames;
d. a bottom frame secured to another portion of the horizontal axis hinge, and pivotable from an upright storage position to a generally horizontal position, the bottom frame being horizontally slidable in the slotted hinge, into and out of a normal position for support of goods thereon; and
e. latches mounted on the side and bottom frames which engage when the bottom frame is slid into the normal position for positively securing the side and bottom frames in the normal positions.

19. A collapsible merchandise cart according to claim 18, in which when the side frames are in their respective normal positions, the bottom frame is pivotable between the upright and the horizontal positions and the latches are both engagable and disengagable.

* * * * *